United States Patent

[11] 3,613,826

| [72] | Inventor | Andre Emile Roger Cabassut<br>Versailles, Yvelines, France |
|---|---|---|
| [21] | Appl. No. | 49,857 |
| [22] | Filed | June 25, 1970 |
| [45] | Patented | Oct. 19, 1971 |
| [73] | Assignee | Bertin & Cie<br>Allee Gabriel-Voisin, Plaisir, Yvelines, France |
| [32] | Priority | June 30, 1969 |
| [33] | | France |
| [31] | | 69 21 997 |

[54] SYSTEM FOR REDUCING NOISE CAUSED BY A STREAM OF FLUID
9 Claims, 7 Drawing Figs.

[52] U.S. Cl. .................................................. 181/33 HC,
  181/33 HD, 239/265.13, 239/265.19
[51] Int. Cl. ........................................................ B64d 33/06
[50] Field of Search ........................................... 181/35 R,
  51, 43, 41, 49, 47 A, 33 HB, 33 HC, 33 HD;
  239/265.13, 265.19, 265.33, 265.39, 265.37

[56] References Cited
UNITED STATES PATENTS
| 2,978,061 | 4/1961 | Keen ............................ | 181/33 HC |
| 3,174,582 | 3/1965 | Duthion et al. ................ | 181/51 |
| 3,524,588 | 8/1970 | Duval ........................... | 239/265.13 |

*Primary Examiner*—Richard B. Wilkinson
*Assistant Examiner*—John F. Gonzales
*Attorney*—Watson, Cole, Grindle & Watson ABSTRACT: A system for reducing noise caused by a stream of fluid comprises a fluid ejection conduit comprising two series of ambient fluid intake vents distributed around its periphery; and Two series of orientatable tubular elements respectively connected to the said vents and arranged to occupy two positions, namely a retracted position in which they are folded back adjacent the inner wall of the conduit and form along the latter a substantially continuous ring bounding a continuous passage for the stream of fluid, and a noise-attenuating position in which the said tubular elements extend obliquely rearwardly and towards the axis of the conduit, the elements of the first series abutting one another at their free end in the noise-attenuating position so as to form a substantially continuous outlet ring for the ambient fluid, while the elements of the second series in the noise-attenuating position lead into the conduit at different distances from the axis of the latter as compared to the distances of the conduits of the other series in the noise-attenuating position.

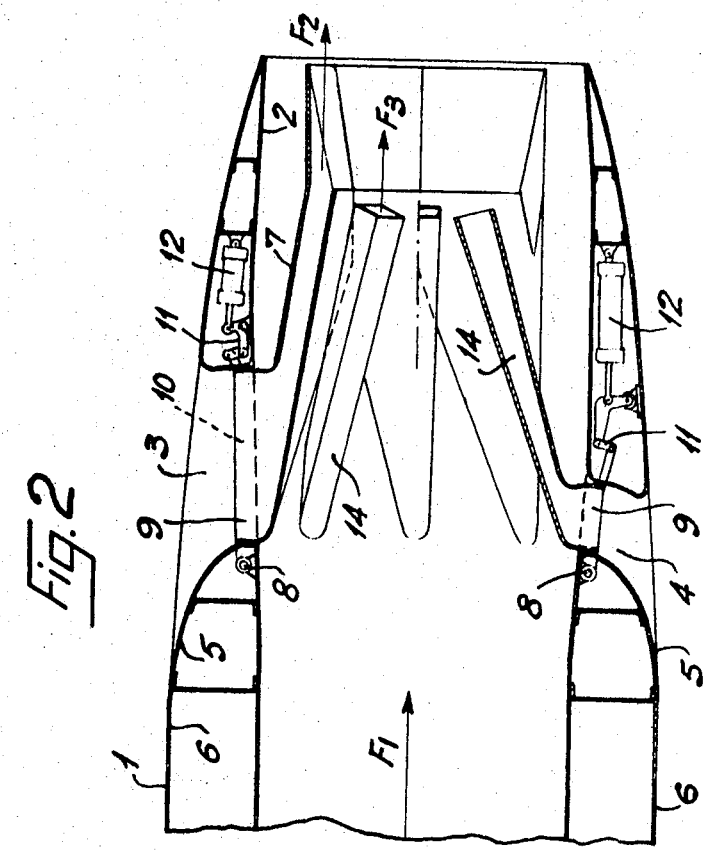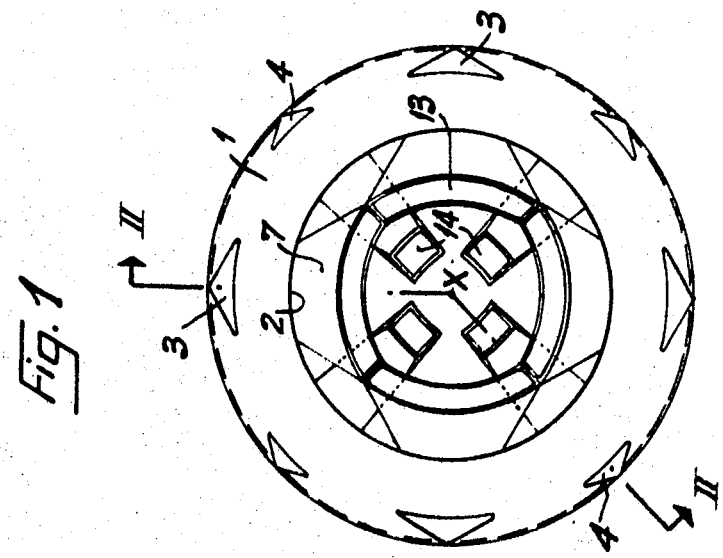

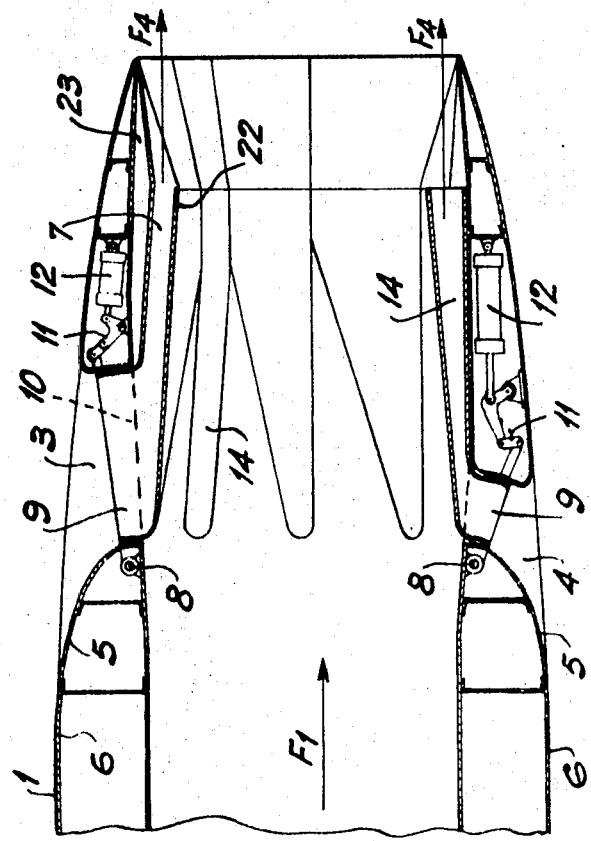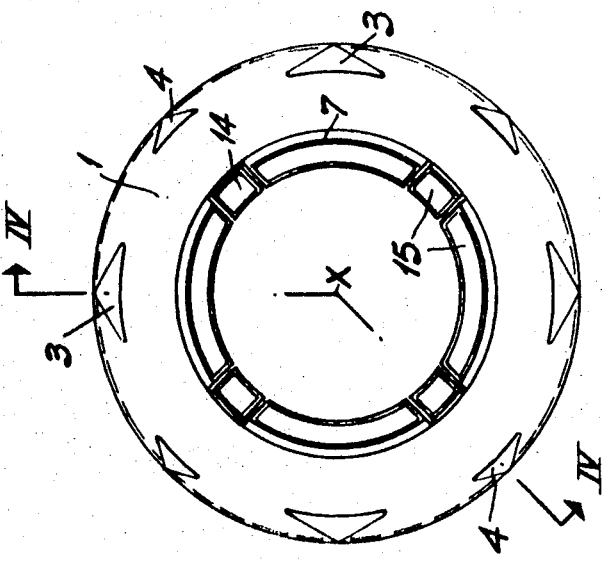

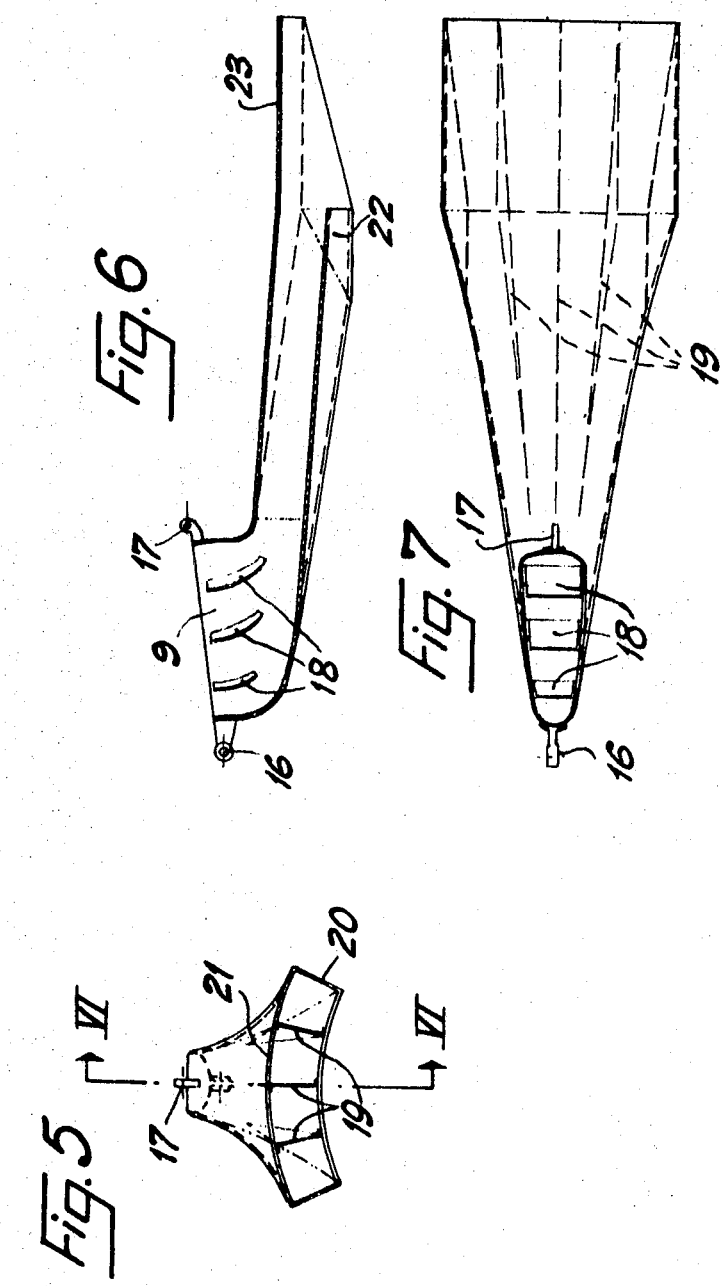

SYSTEM FOR REDUCING NOISE CAUSED BY A STREAM OF FLUID

This invention relates to a system for reducing the noise produced by a stream of fluid escaping from a conduit.

In connection with jet engines in particular, it has already been proposed to reduce the noise produced by the ejection of the gases, by dividing the gas flow into unit streams between which currents of ambient air are induced to dilute the gas mass. Ejection systems are also known which operate in the above way, i.e., by diluting the gases by means of induced ambient air, some of the parts of such systems being movable so that they can be given two configurations; one in which the above-mentioned dilution is obtained, i.e., the "silencer" configuration; and the other, in which the unity of the stream is restored to a varying degree and which is frequently referred to as the "retracted position." The ejection conduit of systems of this kind usually contains obstacles which result in efficiency losses, more particularly at low-speed and high-speed states of operation.

The main object of this invention is to provide a noise-reducing system of variable configuration for a fluid ejection conduit to provide an effective reduction of the noise level at the conduit outlet when the system is in the silencer position and does not obstruct the gas outlet when returned to the retracted position.

To this end, according to the invention, the ejection conduit has ambient fluid intake vents distributed over its periphery, orientatable tubular elements leading from the said vents and being adapted to occupy two positions, namely a silencer position in which they extend obliquely in the downstream direction, and a retracted position in which they are folded back along the inner wall of the conduit, their downstream ends then forming preferably a substantially continuous ring of small thickness over the entire periphery of the conduit.

In the first position, the conduits divide the stream of ejected fluid or primary fluid into unit currents between which they discharge induced ambient fluid or secondary fluid which thus dilutes the primary stream and greatly reduces the noise, while in the other position they form a central continuous passage through which the primary fluid stream flows without being divided up, surrounded at the outlet by an annular stream of induced secondary fluid, thus avoiding any power loss.

The system is also simple to construct and use. It provides a highly refined division of the stream in the silencer position and preserves the neck of the conduit in both positions.

The invention will be more readily understood from the following description with reference to the accompanying drawing which is given by way of example without any limiting force.

FIG. 1 is an end view of a conduit provided with a system according to the invention in the silencer position.

FIG. 2 is a section on II—II in FIG. 1.

FIG. 3 is a similar view to FIG. 1, with the system in the retracted position.

FIG. 4 is a section on the line IV—IV in FIG. 3.

FIG. 5 is an end view of an embodiment of a tubular element.

FIG. 6 is a section on the line IV—IV in FIG. 5.

FIG. 7 is a plan view corresponding to FIGS. 5 and 6.

In the exemplified embodiment shown in the drawing, a turbojet engine 1, of which only the rear portion has been shown, comprises a jet pipe 2 in the form of a body of revolution about the axis X and formed with vents 3 and 4 distributed in two series, e.g., of four each disposed respectively at the apices of two squares offset by 45° about the axis X.

In the downstream direction of the vents 3 and 4 are progressively connected to the jet engine fairing 6 (FIGS. 2 and 4).

Tubular elements 7 which will be described in greater detail with reference to FIGS. 5 to 7 are mounted in the vents 3. Said elements are symmetrical with respect to radial planes. They are articulated at the front about axes 8 perpendicular to the axis X of the pipe 2 and comprise an inlet 9 by means of which they are fitted with a sliding fit in a corresponding portion 10 of the vent 3. At the end remote from the articulation, a linkage 11 controlled by a jack 12 disposed between the pipe 2 and the fairing 6 enables them to be inclined obliquely rearwardly and towards the axis of the pipe as shown in FIGS. 1 and 2, or to be returned to a position extending along the pipe (FIGS. 3 and 4).

The elements 7 flare out rearwardly, where they curve with substantially the same curvature as the pipe 2 so that they can be more readily retracted to a position along the pipe. When they occupy the oblique position their outlet apertures bear on one another so as to form substantially a continuous annular ejection ring 13 visible in FIG. 1.

The vents 4, which are smaller than the vents 3, receive tubular elements 14 which, like the elements 7, are articulated about axes 8 and are moved by means of linkages 11 and jacks 12. Like the elements 7, the elements 14 are connected to the vent by means of an inlet 9 but unlike the elements 7 they narrow out slightly to the rear where they terminate in a section of semicurvilinear quadrilateral shape, i.e., with two curved sides and two straight sides, which more readily matches the shape of the pipe when they are retracted into a position extending along the latter (FIG. 3). The relative dimensions of the elements 7 and 14 are such that in the retracted position the elements 14 fit between the elements 7 and fill the spaces between the outlets thereof so that in end view they form a substantially continuous fluid ejection ring 15 (FIG. 3).

When the elements 14 extend obliquely, their outlet apertures are situated nearer the axis of the pipe than the ejection ring 13 formed by the elements 7 (FIG. 1).

When the elements 7 and 14 extend obliquely, therefore, it will be apparent that the primary fluid flow F1 ejected by the engine is divided by the said elements which inject into the primary flow a first induced ambient secondary fluid flow F2 by means of the ring 13 and a second flow F3 of this same secondary fluid by means of the apertures of the elements 14 (FIG. 2). The silencer effect obtained is excellent as a result of the refined division and the double dilution of the primary flow by the second flows.

When the silencer effect is not required, the jacks 12 retract the tubular elements into position along the surface of the pipe. The primary flow F1 then leaves via the center of the pipe with practically no disturbance while a single annular secondary flow F4 (FIG. 4) leaves via the ring 15 formed by the elements 7 and 14. This eliminates any loss of thrust.

FIGS. 5 to 7 show how the tubular elements 7 can be embodied. These elements flare out substantially so as to be palm-shaped. Their inlet 9 has eyelets 16 and 17 on the outside for articulation on the pivot or axis 8 and the control linkage 11. On the inside, it has guide vanes 18 which render the passage of induced secondary fluid uniform.

The flared portion contains longitudinal guide partitions 19 provided for the same purpose as the vanes 18.

The sidewalls 20 of the flared portion are progressively connected to the edge of the outlet aperture 21 which in end view has the form of a semicurvilinear quadrilateral whose curved sides are centered substantially on the pipe axis when the element is retracted (FIGS. 3 and 5). The connection angle of the walls 20 is so selected that the end of these walls almost touches that of the walls of the elements 14 when all the elements are retracted (FIG. 3).

The bottom curved wall 22 of the flared portion stops in front of the top wall 23 (FIG. 6) at the outlet end of the elements 14 (FIG. 4) to provide a static pump effect which increases the thrust.

The invention can be applied whenever it is desirable to reduce the noise level of an conduit from which a fluid escapes. It is particularly advantageous when applied to the ejection pipes of jet engines, more particularly turbojet engines or stato-jet engines for subsonic or supersonic aircraft and the like.

Of course modifications may be made to the above-described embodiments, more particularly by the substitution of equivalent technical means, without thereby departing from the scope of the invention.

I claim:
1. A system for reducing noise caused by a stream of fluid, comprising in combination:
   a fluid ejection conduit comprising two series of ambient fluid intake vents distributed around its periphery; and
   two series of orientatable tubular elements respectively connected to the said vents and arranged to occupy two positions, namely a retracted position in which they are folded back adjacent the inner-wall of the conduit and form along the latter a substantially continuous ring bounding a continuous passage for the stream of fluid, and a noise-attenuating position in which the said tubular elements extend obliquely rearwardly and towards the axis of the conduit, the elements of the first series abutting one another at their free end in the noise-attenuating position so as to form a substantially continuous outlet ring for the ambient fluid, while the elements of the second series in the noise-attenuating position lead into the conduit at different distances from the axis of the latter as compared to the distances of the conduits of the other series in the noise-attenuating position.

2. The system set forth in claim 1, wherein the outlet apertures of the tubular elements have the form of semicurvilinear quadrilaterals whose curved sides are centered substantially on the axis of the conduit when the said elements occupy the retracted position.

3. The system set forth in claim 1, wherein the vents and the elements of the two series alternate around the periphery of the conduit.

4. The system set forth in claim 3, wherein the elements of the first series are flared out from the corresponding vent, the elements of the second series terminating nearer the axis of the conduit than those of the first series, in the noise-attenuating position.

5. The system set forth in claim 4, wherein the outlet apertures of the tubular elements have the form of semicurvilinear quadrilaterals whose curved sides are centered substantially on the axis of the conduit when the said elements occupy the retracted position, the rectilinear sides of the quadrilaterals corresponding to the elements of the first series being situated in substantially radial planes in relation to the conduit when the elements occupy the noise-attenuating position and the rectilinear sides of the quadrilaterals corresponding to the elements of the second series being situated in planes parallel to those containing the rectilinear sides of the outlet apertures of the elements of the first series which are adjacent thereto.

6. The system set forth in claim 5, wherein the elements of the first series have an outer wall longer than the inner wall, the inner wall stopping substantially level with the end of the elements of the second series when the various elements are in the retracted position.

7. The system set forth in claim 1, wherein at least some of the tubular elements contain guide means.

8. The system set forth in claim 1, wherein the tubular elements are articulated about axes perpendicular to the axis of the conduit.

9. The system set forth in claim 1, wherein the tubular elements are associated with control jacks outside the conduit.